(12) United States Patent
Leblond et al.

(10) Patent No.: US 7,927,093 B2
(45) Date of Patent: Apr. 19, 2011

(54) FLUID FLOW CONTROL ASSEMBLY FOR A CONTAINER BLOWING MACHINE AND MACHINE COMPRISING ONE SUCH ASSEMBLY

(75) Inventors: Regis Leblond, Octeville sur Mer (FR); Thierry Lemble, Octeville sur Mer (FR); Laurent Danel, Octeville sur Mer (FR); Gilles Robert, Octeville sur Mer (FR); Denis Gillet, Octeville sur Mer (FR); Othmar Rymann, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 653 days.

(21) Appl. No.: 11/916,561

(22) PCT Filed: Aug. 16, 2006

(86) PCT No.: PCT/FR2006/001951
§ 371 (c)(1),
(2), (4) Date: Dec. 5, 2007

(87) PCT Pub. No.: WO2007/020354
PCT Pub. Date: Feb. 22, 2007

(65) Prior Publication Data
US 2008/0213423 A1 Sep. 4, 2008

(30) Foreign Application Priority Data

Aug. 12, 2005 (FR) ...................................... 05 08545

(51) Int. Cl.
*B29C 49/12* (2006.01)
*B29C 49/58* (2006.01)
(52) U.S. Cl. ........................................ 425/529; 425/535
(58) Field of Classification Search .................. 425/529, 425/535
See application file for complete search history.

(56) References Cited

U.S. PATENT DOCUMENTS
3,834,848 A * 9/1974 Farrell .......................... 425/136
(Continued)

FOREIGN PATENT DOCUMENTS
DE 20305232 U1 5/2003
(Continued)

OTHER PUBLICATIONS
Partial machine translation of DE10355365A1 dated Jun. 2005 obtained from the esp@ce.net website.*

*Primary Examiner* — Robert B Davis
(74) *Attorney, Agent, or Firm* — Sughrue Mion, PLLC (57) ABSTRACT

The invention relates to a fluid flow control assembly for a container blowing machine, comprising: a blow pin (1); a plurality of pipes for the circulation of a blowing fluid, which enable the blowing fluid to flow between at least one blowing fluid source, at least one fluid discharge outlet and the aforementioned blow pin (1); and valves which can control the flow of the blowing fluid inside the plurality of fluid circulation pipes. The invention is characterized in that the valves are all placed on the front of a body (3) housing the blow pin (1).

29 Claims, 9 Drawing Sheets

U.S. PATENT DOCUMENTS

| | | | |
|---|---|---|---|
| 4,214,860 A | | 7/1980 | Kleimenhagen et al. |
| 4,488,863 A | * | 12/1984 | Collette .................. 425/530 |
| 4,596,271 A | * | 6/1986 | Brundage .................. 137/540 |
| 6,464,486 B1 | | 10/2002 | Barray et al. |
| 7,674,108 B2 | | 3/2010 | Lemaistre |
| 2002/0171179 A1 | * | 11/2002 | Dundas et al. ............. 264/525 |
| 2003/0118686 A1 | * | 6/2003 | Voth et al. ................ 425/529 |
| 2003/0209266 A1 | * | 11/2003 | Dupuis ................ 137/115.04 |

FOREIGN PATENT DOCUMENTS

| | | |
|---|---|---|
| DE | 10355365 A1 * | 6/2005 |
| EP | 1 328 396 B1 | 5/2005 |
| EP | 1535720 A1 | 6/2005 |
| FR | 2 764 544 A1 | 12/1998 |
| FR | 2 872 082 A1 | 12/2005 |
| WO | 0234500 A1 | 5/2002 |

* cited by examiner

FLUID FLOW CONTROL ASSEMBLY FOR A CONTAINER BLOWING MACHINE AND MACHINE COMPRISING ONE SUCH ASSEMBLY

TECHNICAL FIELD

The present invention generally relates to the field of the manufacture of containers made from thermoplastic material, such as for example PET or PEN, by a blowing process, in particular extrusion blowing, injection blowing, or stretch blowing from a blank.

The definitions which follow are only given for reasons of clarity.

These definitions refer to the vocabulary generally used in the fields concerned by the present invention.

The term "PET" denotes poly(ethylene-terephthalate), i.e. a polyester obtained, for example, by polycondensation, from terephthalic acid and ethylene glycol.

The term "PEN" denotes poly(ethylene naphthalate). This is also a polyester.

The term "blank" denotes a preform or an intermediate container.

A preform is generally a substantially tubular object closed at one axial end and of which the opening has the definitive shape of the neck of the final hollow body, such as a bottle or flask.

The term "blowing" denotes a method in which the blank is placed in a finishing mold containing the shape of the container to be obtained, a blowing nozzle (or blowing tip) communicating with the opening (the neck) of said blank, and a highly pressurized blowing fluid forcing the material of the blank against the walls of the mold. The finishing mold is, for example, a billfold mold. The blowing fluid is generally air.

During injection blowing, the blanks are often preforms and are obtained by injection, the blowing pressures typically being in the order of 40 bars ($40 \times 10^5$ Pa).

The term "stretch blowing" denotes a method in which a drawing rod (also known as a bar) stretches the preform in the blow mold, by bearing against the bottom wall of the preform. Such a method is implemented in machines known as single blow-molding machines. Such a method is, in particular, used for blowing previously injected preforms, the stretching (or elongation) being carried out before or during the blowing of the preform. When the stretching precedes the blowing, pre-blowing is carried out to avoid, in particular, that the material contracts onto the drawing rod. Before the stretch blowing operation, the thermoplastic preforms are heated in a conditioning oven in order to be brought up to a temperature which is higher than the glass transition temperature of the thermoplastic material.

The term "stretch blowing" also denotes, in this case, a method in which a drawing rod stretches an intermediate container. Such a method is used in machines known as double blow-molding machines.

BACKGROUND OF THE INVENTION

A nozzle for a blowing machine comprises an end which is shaped to communicate sealingly with the inside of a blank.

Blowing machines are known in which the end of the nozzle, in the functional position, cooperates positively with the neck of the blank either by sealingly abutting against the lip (edge) of the neck of the blank, or being sealingly fitted into or onto the neck of the blank.

The end of the nozzle (sometimes known as the nozzle tip) is, for example, truncated, the diameter at the base of the nozzle being less than that of the opening of the blank. The seal during the blowing is thus ensured by the contact between the truncated cone and the internal peripheral edge of the lip of the blank.

Blowing machines are also known in which the end of the nozzle is bell-shaped and larger than the neck of the blank and covers said neck of the blank by bearing at the front, sealingly, against the face of the mold on which the neck of the blank projects (see for example the document FR 2 764 544).

In the known manner, the nozzle is designed to be entirely or partially mobile, axially above the blow mold between:
an upper position or raised position in which the nozzle is not functional (the opening and closing of the mold allowing the loading of a blank and the discharge of the molded container)
and a lower position or blowing position in which the end of the nozzle cooperates sealingly either with the neck of the blank or with the face of the mold above which the neck of the blank projects and in which the nozzle is functional.

The blowing of bottles made of PET from preforms is usually carried out in stages:
a step of pre-blowing the blank using a moderately pressurized fluid (generally air) (for example $7 \times 10^5$ Pa to $12 \times 10^5$ Pa), generally accompanied by mechanical axial stretching by means of said drawing rod
then a blowing step itself, at high pressure, for example 40 bars ($40 \times 10^5$ Pa)
and finally an exhaust (or degassing) step with the discharge of the pre-blowing/blowing air. If necessary, the degassing air is recovered. A silencer mechanism is assigned to the degassing.

The pre-blowing typically leads to an increase in pressure of 0 to 13 bars in approximately 100 milliseconds. The blowing leads typically to an increase in pressure up to a nominal value of 23 bars in approximately 100 milliseconds. The degassing is typically carried out in approximately 300 milliseconds. The pre-blowing and the blowing may be partially simultaneous. In the past, controlling the pressures has been extremely important for the quality of the blown products.

The stretching of a blank made of PET and the pre-blowing at moderate pressure (for example $7 \times 10^5$ Pa) lead to an axial elongation velocity in the order of 0.8 to 1.2 m/s, controlling this velocity being important for the quality of the blown product. The radial stretching obtained by blowing at high pressure (for example $40 \times 10^5$ Pa) allows the material to be forced against the walls of the mold which is cooled down, for example, by the internal circulation of cooled water.

It is frequently possible to achieve 50,000 bottles per hour in industrial blowing machines. These high-speed machines are of the rotating type and comprise several tens of molding devices mounted on the periphery of a carousel.

To carry out the pre-blowing/blowing/discharge steps, conventionally three solenoid valves are sequentially controlled which, on the one hand, are connected respectively to a source of moderately pressurized fluid, a source of highly pressurized fluid and an exhaust and which, on the other hand, are connected to the nozzle.

Amongst the technical problems to be solved, it is noteworthy that a blowing machine of the type under consideration consumes very large amounts of pressurized fluid, of which one portion is not necessary for the manufacture of the article, whether it is at moderate or high pressure.

The blowing of a hollow body of one liter by stretch blowing typically requires 40 liters of fluid if the blowing pressure is $40 \times 10^5$ Pa.

It has to be understood that the only required volume for the blowing operation is the volume of the container brought into its final shape against the walls of the mold cavity of the mold, in other words substantially the volume of the mold cavity.

In contrast, all the volumes between the outlet of the pre-blowing or blowing solenoid valve and the neck of the container are volumes which are not actually required for the deformation of the blank and are thus dead volumes.

For manufacturing bottles by blowing, the dead volume thus represents the difference between the total volume to be put under pressure and the internal volume of the bottle at the edge of the lip or required volume.

At each step for pre-blowing and blowing a blank, these dead volumes are filled with pressurized fluid in the same manner as the required volume, which involves a production of pressurized fluid which is substantially greater than the actual requirement. In the majority of blowing machines of the prior art, the dead volumes are of a size which is not inconsiderable relative to the required volumes.

Any reduction in these dead volumes proves beneficial in terms of possible reduction of the power of the fluid compressor and thus its cost, and in terms of reducing the electrical energy required by the functioning of the compressor. The continuous production of pressurized fluid (air) in a large quantity leads to a very high consumption of electrical energy for the functioning of the compressor(s).

As a result, there is a constant and urgent need on the part of the users of said blowing machines for a reduction which is as large as possible of the quantity of pressurized fluid used, so as to reduce the consumption of electrical energy.

It is also noteworthy that the blowing machines function at ever increasing speeds. The production rates are in the order of 1200 to 2000 containers per hour and per mold in the stretch blowing machines of the applicant. Even when anticipating very long service lives for the solenoid valves (in the order of 30 million cycles), maintenance and adjustment operations on said solenoid valves remain relatively frequent.

In a first design of the applicant, the solenoid valves form a unit mounted directly on the body of the nozzle, at the position of the tube connector referenced 23 in FIG. 1 of the document FR 2 764 544.

However, in this first design which is currently in existence, the juxtaposition of the two respective bodies of the solenoid valve unit and of the nozzle also involves fluid passages of considerable length which results in a dead volume which is still very large in terms of consumption.

A second design, also from the applicant, has been the subject of a French patent application filed on 23 Jun. 2004 under the number FR 04/06844 (publication number FR 2 872 082).

According to this second design, the nozzle slides in a body provided with three housings, in each of which a solenoid valve is incorporated: the pre-blowing solenoid valve, the blowing solenoid valve and the exhaust solenoid valve. This nozzle surrounds a drawing rod which is coaxial thereto.

An annular space for the passage of air is defined in said body by the drawing rod and the internal face of the nozzle. Each housing containing a solenoid valve is connected to said annular space by a radial pipe.

A fourth housing in the body may receive a recycling solenoid valve, which is actuated after the blowing, whilst the exhaust solenoid valve is actuated last of all for the rapid removal of the residual blowing fluid.

The housings for solenoid valves are equidistant, substantially cylindrical, and parallel or perpendicular to the sliding axis of the nozzle. Said housings are, for example, radial relative to said nozzle axis.

When each solenoid valve is arranged radially relative to the central bore of the body in which the nozzle slides, the mobile core of each solenoid valve may be mounted directly in the housing which has been machined to this end, and the front face of said mobile core may be flush with the lateral wall of the bore and be within the continuation of this lateral wall. As a result of this design, the dead volume downstream of the mobile core is reduced very significantly.

This second design has several drawbacks. In particular, it requires free access to be allowed to the different sides of the body, which may not be possible in certain configurations of machine.

More specifically, according to a particular embodiment, the blowing nozzles are placed in a blowing machine adjacent to one another, on a carousel, adjacent to the periphery of said carousel.

In order to increase production rates, it would be necessary to increase the number of nozzles around this central shaft or to increase the overall volume of the machine, this latter solution not being desirable.

Access to the lateral parts of a nozzle may therefore be quite difficult and awkward in the case where the number of nozzles on the carousel exceeds a certain amount, resulting in a limited space for intervention between two successive nozzles.

It is appropriate, therefore, to limit the presence of parts fixed to the lateral faces of a nozzle to avoid maintenance operations on these faces and thus to be able to increase the number of nozzles around the same central shaft of a carousel whilst not increasing the overall volume of the machine.

A third design is illustrated by the document EP 1 328 396.

In this third design, the valve support is of rectangular section and a high pressure valve, a low pressure valve, and two exhaust valves are arranged at the same height on two opposing faces of this valve support. Internal pipes which are as short as possible place the valve chambers in fluidic connection with the sliding axial orifice of the drawing rod.

This third design proves to be impractical in usage. As mentioned above, high-speed machines are rotary. When the valve support units of the type disclosed in the document EP 1 328 396 are used, the valves are, for an observer positioned in front of a blow mold, positioned to the right and to the left of each support unit, the lateral space requirement of these valves and of their control members being very disadvantageous for the compactness of the machine and as has been explained above relative to the second design.

According to a fourth design as disclosed in the document EP 1 535 720, a fluid flow control assembly for a blowing machine is shown, this assembly comprising supply and discharge pipes for fluid, a blow pin and a plurality of valves to control the blowing air in the different pipes.

However, according to this prior art, the different valves are arranged tightly relative to the blow pin and it is thus necessary to dismantle the body which houses the blow pin if the valves have to be repaired or changed.

It would, therefore, be particularly advantageous to produce an assembly for controlling the blowing which does not require the blow pin to be dismantled or to be acted upon when maintenance or repair operations have to be carried out on the valves for controlling blowing fluids.

The object of the invention is, therefore, to attempt to satisfy, as far as possible, these constant demands of users and to propose an improved design of blowing machine which leads to a better compromise between:
 on the one hand low dead volumes in the circuit for supplying pressurized fluid;

and, on the other hand, structural assemblies for controlling the flow of a blowing fluid for a blowing machine which are light-weight, compact, of easy maintenance and with rapid access to the valves without restrictions to the spatial requirement, in particular laterally, due to the presence of a plurality of functional assemblies located around a central shaft of the carousel. The assembly according to the invention also makes it possible to avoid dismantling the unit housing the blow pin during operations for maintenance or replacing the valves.

SUMMARY OF THE INVENTION

To these ends, the invention relates, according to a first aspect, to a blowing fluid flow control assembly for a container blowing machine, said assembly comprising a blow pin; a plurality of pipes for the circulation of a blowing fluid allowing the circulation of the blowing fluid between at least one source of blowing fluid, at least one discharge outlet for fluid and the blow pin; and valves capable of controlling the circulation of the blowing fluid in the plurality of pipes for the circulation of fluid, the assembly according to the invention being characterized in that the valves are all placed on the front of a unit housing the blow pin.

This assembly has, according to various embodiments, the following characteristics, if necessary combined:
- the plurality of pipes comprises pipes inside the unit housing the blow pin and connecting the valves to the blow pin;
- the plurality of pipes comprises pipes inside the unit housing the blow pin and connecting said at least one source of blowing fluid and said at least one discharge outlet for blowing fluid to the valves;
- the valves are housed in a unit removably mounted on the front of the unit housing the blow pin. It is thus possible in one single rapid operation to change the entire valve unit. This is advantageous, in particular when the operator does not know or does not have the time to determine which valve is faulty;
- the control assembly comprises a bored flange removably mounted on the rear of the unit housing the blow pin and to which are connected said at least one source of blowing fluid and said at least one discharge outlet for blowing fluid;
- the flange comprises internal pipes connecting said at least one source of fluid and said at least one discharge outlet for blowing fluid to the internal pipes of the unit housing the blow pin;
- the bored flange and/or the unit housing the valves are mounted by screwing onto the unit housing the blow pin and the heads of these screws are oriented toward the front of the control assembly. The installation and dismantling may thus be carried out without difficulty from the front of the assembly, which is very advantageous for the maintenance operations of rotating blowing machines comprising several tens of control assemblies;
- the control assembly comprises a drawing rod which is axially mobile in the blow pin, said drawing rod passing through the bored unit housing the blow pin;
- the valves comprise a valve connected to a first source of blowing fluid and a valve connected to a second source of blowing fluid at a higher pressure than the blowing fluid of the first source;
- the control assembly comprises an expansion valve connected to the blow pin and capable of discharging the blowing fluid blown into the container toward said at least one discharge outlet;
- the control assembly comprises a recycling valve capable of recycling the blowing fluid blown into the container by conveying it to a source of blowing fluid. This optional configuration makes it possible, if necessary, for savings to be made at the production station for pressurized fluid. The recycling valve is connected to a circuit for recycling or reutilizing air, for example by being directed toward a source of lower pressure used for the pre-blowing;
- the valves are positioned in housings which are narrowed in a direction substantially perpendicular to the blow pin;
- the control assembly comprises a casing housing the pilot controls of the valves, said casing being removably mounted on the front of the unit housing the valves;
- the casing is mounted by screwing, using screws, onto the unit housing the valves, the heads of said screws being oriented toward the front of the assembly;
- the valves are solenoid valves;
- the pilot controls for the solenoid valves are electromechanical or electropneumatic;
- each housing of the solenoid valves provided in the body housing the solenoid valves is machined so as to define, directly in the body housing the solenoid valves, the chamber of the solenoid valve capable of housing the mobile core of the solenoid valve;
- each housing of the body housing the solenoid valves is shaped to receive one respective solenoid valve cartridge. A solenoid valve cartridge comprises a casing defining a chamber and provided with a seat. The chamber houses a mobile core (or piston). The seat may receive said mobile core in a sealed resting position, of which the head forms a flap valve when it rests sealingly against said seat. The wall of the casing is perforated by at least one aperture in communication with a pipe for supplying fluid. A closure cap of the casing of the solenoid valve is fixed to a wall of the body, a device for piloting the solenoid valve is mounted on said cap. Said piloting device is of the pneumatic type.

According to a second aspect of the invention, the invention relates to a machine for blowing, using a pressurized fluid, containers from blanks made from thermoplastic material of which the body is enclosed in a blow mold, said machine comprising a nozzle having one end shaped to be functionally and sealingly connected to the neck of a blank and comprising a plurality of valves for selectively connecting said nozzle to one respective source of moderately pressurized fluid for the pre-blowing, a source of highly pressurized fluid for the blowing and an exhaust for discharging the pre-blowing/blowing fluid, said machine comprising at least one control assembly as characterized above.

Advantageously, the control of the movement of the blow pin is ensured by means of equipment guided and fixed to the control assembly, and actuated by a cam on a roller.

Advantageously, the pin is provided with a groove, a fork guided in this groove ensuring the conversion of the movement of the roller on the cam into a sliding movement of the mobile equipment and the blow pin.

According to a first embodiment, the counterforce exerted to maintain the drive roller on the cam is produced by a mechanical spring or by a pneumatic spring incorporated in the form of a piston fixed to and concentric to the blow pin, said pneumatic spring traveling in a chamber of which the upper part is pressurized.

According to a second embodiment, the control of the movement of the blow pin is ensured pneumatically, the pin being fixed to a concentric piston, traveling in a chamber of which the upper and lower parts are connected to a pneumatic distributor.

Advantageously, the lower position of the blow pin is implemented by a stop which may be adjusted on said blow pin, said stop being arrested by damping contact on the upper part of the unit housing the blow pin.

The structures of the control assembly and machine assembly as shown provide numerous advantages.

The invention provides, in particular, an excellent compromise: cost saving (more economical arrangement), space saving (possibility of a more compact arrangement and/or space available for mounting other components), weight saving (reduction of the inertia on a rotating structure of the carousel type), lower dead volumes.

BRIEF DESCRIPTION OF THE DRAWINGS

The invention will be understood more clearly by reading the detailed description which follows of specific preferred embodiments, which are given purely by way of illustrative example and in no way limit the invention.

In this description reference is made to the accompanying drawings, in which.

DESCRIPTION OF THE PREFERRED EMBODIMENT OF THE INVENTION

Figure 1:
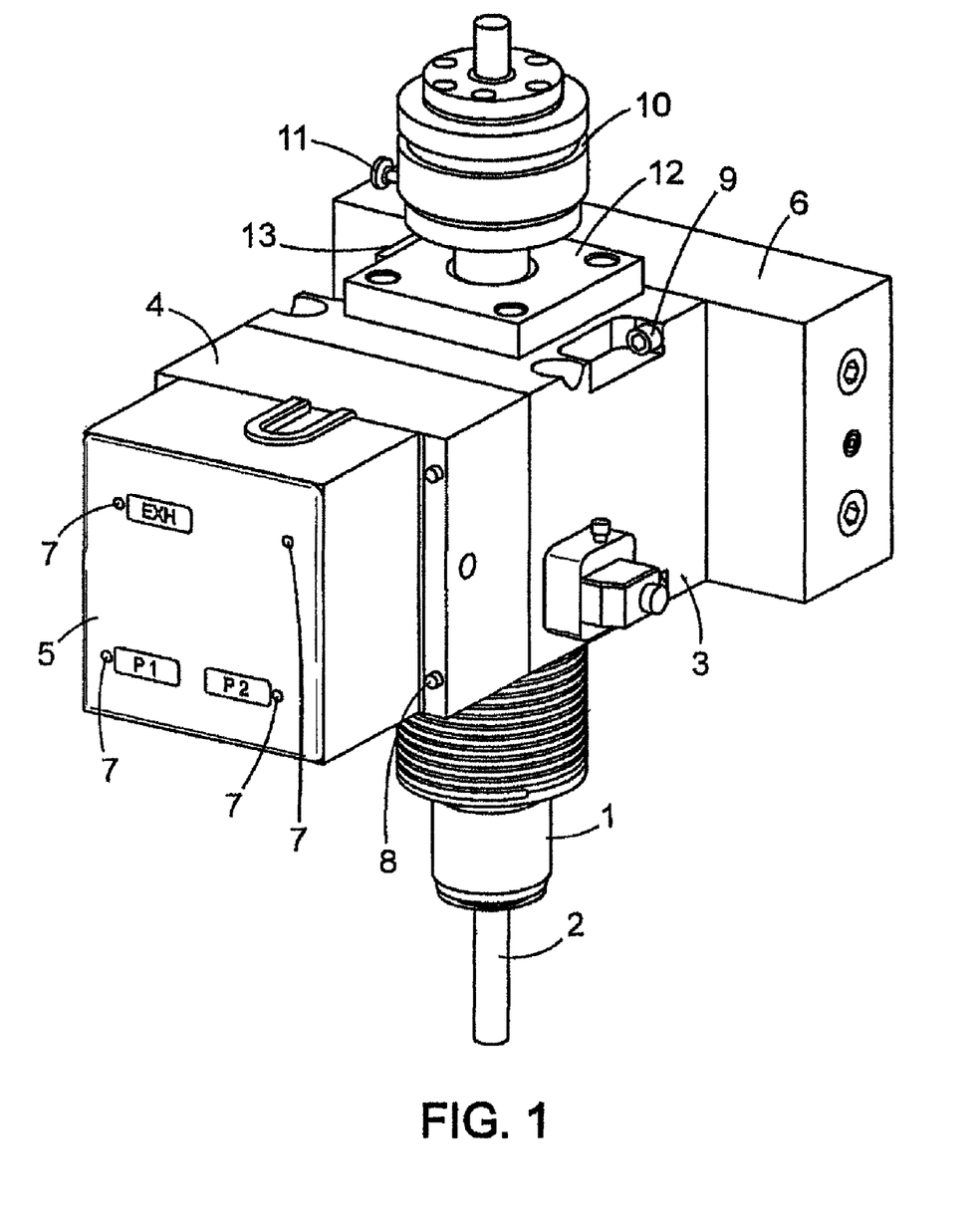
FIG. 1 is a perspective view of a blowing fluid flow control assembly according to an embodiment of the invention.

Reference is made firstly to FIG. 1.

A blow pin 1 and a drawing rod 2 are mounted, in a manner known per se, axially and passing through a body 3 provided with internal pipes for the passage of pre-blowing/blowing and exhaust/degassing fluid, said pipes being, in particular, illustrated in FIGS. 7 and 9 and disclosed more precisely below.

The drawing rod 2 is axially mobile in the blow pin 1 and passes through the bored body 3 housing the blow pin 1.

Said body 3 is of rectangular section and has a substantially cuboid cover.

The present invention generally relates to a blowing fluid flow control assembly for a blowing machine, said assembly comprising a blow pin 1; a plurality of pipes for circulating a blowing fluid allowing the circulation of a blowing fluid between at least one source of blowing fluid, at least one discharge outlet for blowing fluid and the blow pin 1; and valves capable of controlling the circulation of blowing fluid in the plurality of pipes for circulating fluid.

In the description which follows, by the concept of "front" or "frontal" is understood an element, an area or a part of the assembly according to the invention located on the same side as the side where the blow molds open and close relative to the "rear", corresponding to the side where the closing/opening axis of the blow mold is located.

In the case of a blowing machine where the control assemblies are arranged adjacent to one another so as to form a rotating ring around a central shaft of a carousel, each assembly being surrounded on both sides by an identical control assembly, by the concept of "front" or "frontal" is thus understood an element, an area or a part of the control assembly which is placed radially toward the exterior of the rotating ring for circulating the functional assemblies. Similarly, by "rear" element is understood an element placed radially toward the interior of the rotating ring for circulating the control assemblies, and located opposite an element positioned on the "front".

The functional assembly or blowing fluid flow control assembly according to the invention comprises a body 3 having an axial bore in which may be displaced, under the action of generally pneumatic control means, a mobile element or nozzle in the form of a tubular rod of which one part may be designed in the form of a piston. By way of illustration, the design of the body 3 and of the mobile nozzle may, for example, be of the type shown in FIG. 1 of the document FR 2 764 544. At its lower end, the mobile nozzle is shaped in any desired manner to be able to be functionally and sealingly connected to the neck or mouth of a container blank, for example a preform or the upper face of a blow mold, in order to cover the neck of the blank.

Conventionally, the mobile nozzle in the shape of a tubular rod surrounds a drawing rod 2 which is coaxial thereto and which is itself axially displaceable, during the blowing, to drive mechanically the bottom of the blank, according to a known technique. The drawing rod 2 is maintained in a coaxial position by guide members, not shown on the figures. The diameter of the drawing rod 2 is less than that of the internal face of the mobile nozzle so as to define an axial annular passage intended for the supply of pre-blowing fluid and blowing fluid and for the discharge of said fluid at the end of the process.

In the front part of said body 3, a unit 4 containing housings for valves, advantageously solenoid valves, is removably mounted on a single face of the body 3, for example by screwing, and, more specifically, the unit 4 is located on the front or frontal face of the body 3. The valves are thus housed in a single unit 4 mounted removably on the front of the body 3 housing the blow pin 1.

Removably mounted on the front of the unit 4 housing the valves, i.e. on the same face of the unit 4 housing the valves, a casing 5 houses the pilot controls for the valves, in addition to diodes 7 for visualizing the state of the pilot controls for the solenoid valves.

The valves housed in the unit 4 on the front of the body 3 are advantageously solenoid seat valves, of the type known per se, and the pilot controls of the valves housed in the casing 5 are electromagnetic or electropneumatic.

Figure 7:
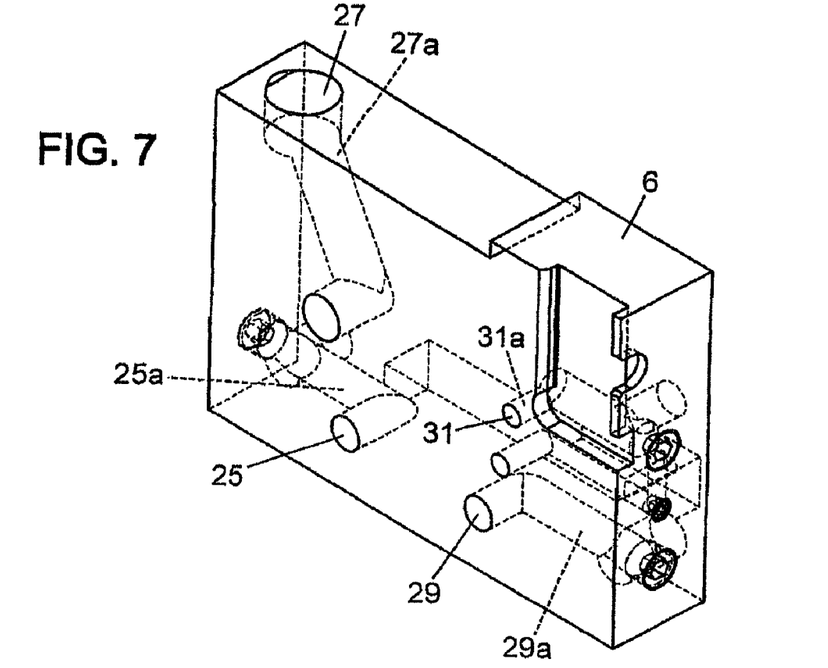
FIG. 7 is a perspective view of the rear flange on which at least one source of blowing fluid and at least one discharge outlet for blowing fluid are capable of being fixed, the different pipes for the passage of fluid being shown in dotted lines.

A bored flange 6 and as shown in perspective in FIG. 7, provided with internal pipes 25a, 27a, 29a, 31a for the passage of blowing fluid, at moderate as well as high pressure or for recycling and/or the discharge of air, is placed on the rear face of the body 3. Said flange 6 is removably mounted on the rear face on the body 3 housing the blow pin, for example by screwing.

At least one source of blowing fluid is advantageously connected to the rear bored flange 6 and more specifically to at least one source of moderately pressurized blowing fluid and a source of highly pressurized blowing fluid. Moreover, it is also provided to connect at least one discharge outlet for blowing fluid on the rear flange 6 allowing the blowing air to be discharged either into the atmosphere or toward a source of blowing fluid, for example the source of blowing fluid at moderate pressure, or a source of blowing fluid at lower pressure.

Similarly, also provided in the unit 3 housing the blow pin 1 are pipes or internal perforations 25b, 27b, 29b, 31b connecting the internal pipes 25a, 27a, 29a, 31a of the flange 6 to the valves, said pipes or internal perforations 25b, 27b, 29b, 31b allowing in particular the passage and the supply of the valves with fluid at moderate or high pressure originating from the internal pipes 25a, 27a, 29a, 31a of the flange 6.

The valves are connected to the nozzle of the blow pin 1 by pipes inside the body 3 housing the blow pin 1, and more specifically by means of a principal axial pipe having a plurality of secondary pipes 20, 21, 22, 23, each secondary pipe 20, 21, 22, 23 being directly connected to a valve. The principal axial pipe and secondary pipes 20, 21, 22, 23 are shown in a more detailed manner in FIGS. 3 and 4.

The blow pin 1 forms the lower part of an assembly which acts as a piston, said piston forming part of an actuator of which the cylinder forms the body 3.

Figure 10:
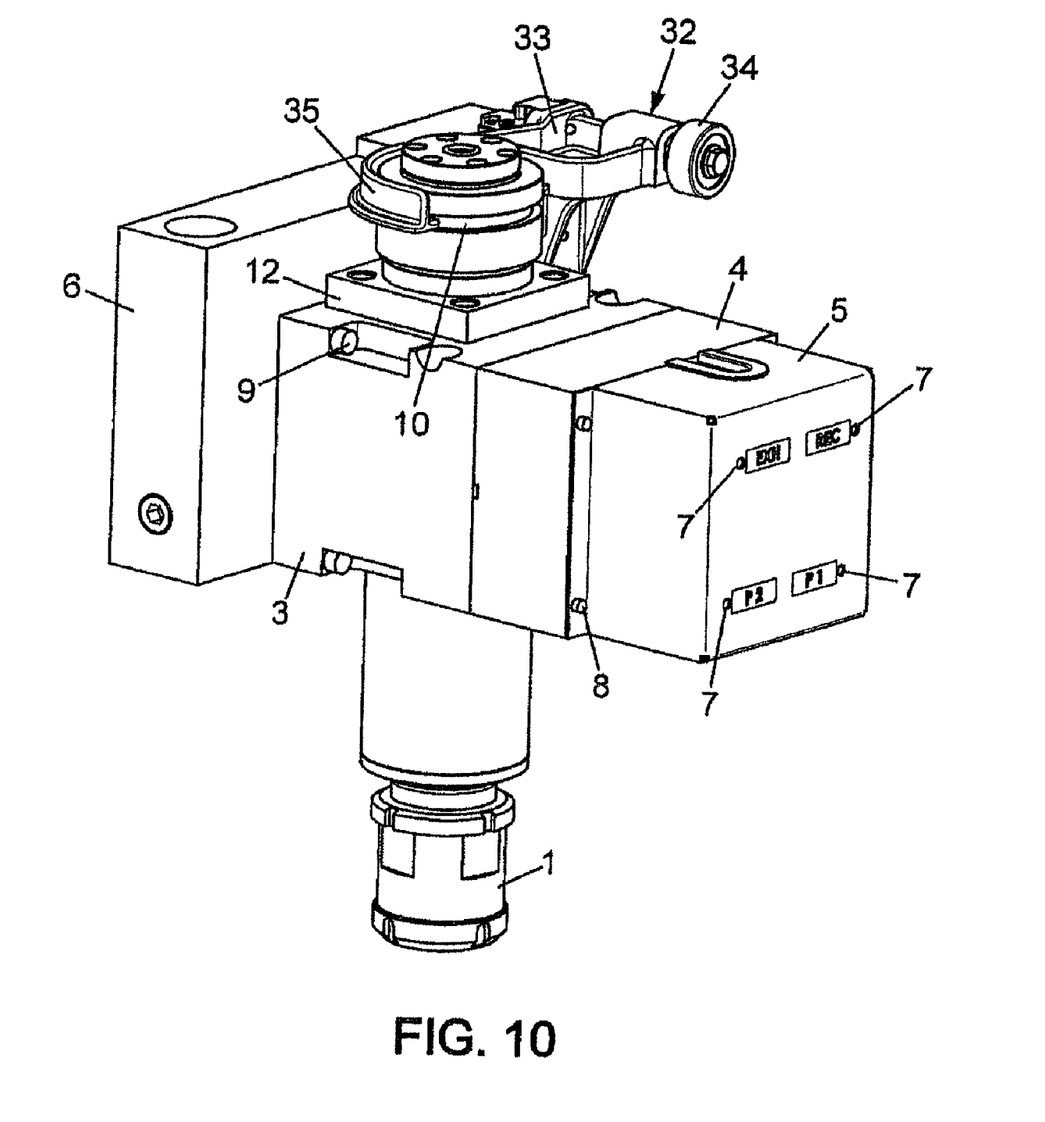
FIG. 10 is a second perspective view of the control assembly according to the invention with the guide fork for the sliding of the blow pin.

Control means 32, partially shown in FIG. 10, cause the lowering movement of said piston and thus of the blow pin, until said pin comes into sealing contact with the inside of the blank to be blown. Said control means are engaged with an external annular groove 10 of a tubular part fixed to the upper part of the piston or the blow pin 1.

A transverse cover 12 is mounted on the body 3. In the end of travel position, a shock-absorbing gasket is pressed against said cover 12.

In other words, the functional or control assembly, shown in FIG. 1, thus comprises:
  an actuator body 3 of which the external cover incorporates, on the front, moderate pressure pre-blowing valves, high pressure blowing valves, degassing valves and optionally valves for recycling air;
  a flanged bored unit 4 on the front of the body 3 of the actuator and containing the valves;
  an assembly housing the pilots, for example, electropneumatic pilots for the control of the valves, said assembly being housed in the casing 5 mounted removably on the front of the bored unit 4 housing the valves. Advantageously, the casing 5 is installed by screwing, using screws 8, onto the unit 4 housing the valves, the heads of said screws 8 being oriented toward the front of the control assembly;
  a bored flange 6 placed to the rear of the body 3 of the actuator, said flange 6 forming an interface for the connection to the fluidic pipes, i.e. for supplying the assembly with air at moderate and high pressure and for its recycling and discharge.

As appears in particular in FIG. 1, the lateral faces of the functional or control assembly are particularly accessible. The functional or control assemblies may thus be very adjacent to one another, for example in a rotating blowing machine, said machine therefore being able to be of large capacity and compact, the maintenance operations on the functional assemblies remaining simple, all the members of said assemblies being able to be installed and dismantled from the front of the machine.

The bored flange 6 receives on its rear face the connectors for fluidic energy connections, advantageously by rapid connection. The body 3 of the actuator of the nozzle is fixed by means of several screws 9 onto the flange 6 and the fluidic connections of the actuator are made by this single operation.

For dismantling during maintenance operations of the valves, it is not necessary to disconnect the fluid pipes, the flange 6 remaining on the machine.

More specifically, the rear bored flange 6 and/or the unit 4 housing the valves are installed by screwing onto the body 3 housing the blow pin 1, the heads of the screws 9 being oriented toward the front of the control assembly.

When reinstalled, centering pins (not shown) guarantee correct positioning of the actuator body 3 on the rear flange 6: no adjustment has to be made.

The means for the travel of the blow pin 1 are now disclosed and as partially shown in FIG. 10.

According to a first embodiment, the control of the vertical sliding movement of the blow pin 1 is ensured by control means 32 and more specifically by equipment 33 which is mobile, guided and fixed to the control assembly and actuated by a cam on a roller 34. The guided equipment 33 is thus mobile according to the displacement of the roller 34 on the cam and the distance between the cam and the control assembly. The movement is transmitted from the guided mobile equipment 33 to the pin 1 by a fork 35 guided and positioned in the groove 10 of the pin 1. Thus the fork 35 fixed in the groove 10 ensures the conversion of the movement of the roller 34 on the cam into a vertical sliding movement of the mobile equipment 33 and of the blow pin 1.

The counterforce exerted to maintain the control roller 34 on the cam may be produced in two separate ways:
  either by a mechanical spring, of the type known per se;
  or by a pneumatic spring, of the type known per se, incorporated in the form of a piston which is fixed to and concentric to the pin 1, traveling in a chamber of which the upper part is pressurized. The adjustment of the pressure makes it possible to adjust the amount of force. The lower chamber may thus be used for controlling the lifting of the nozzle.

In a further embodiment, the control of the traveling movement of the pin is ensured pneumatically. In other words, the pin 1 is fixed to a concentric piston, traveling in a chamber of which the upper and lower parts are connected to a pneumatic distributor.

The positioning of the pin 1 will now be described.

The lower position of the pin 1 is implemented and obtained by a stop 11 which may be adjusted on the pin 1, arrested by a damping contact 13 (only shown in FIG. 1) on the upper part of the actuator, i.e. on the upper part of the body 3 housing the blow pin 1.

This configuration provides at least two advantages:
  adjustments to the lower position of the pin 1 do not affect the position of the groove 10/fork 35/guided equipment 33/roller 34 assembly. The relative position of the cam as regards the roller 34 does not have to be modified in the event of modifying the lower position of the pin;

the end attached to the pin, and comprising the seal for blowing the hollow bodies, does not have to be adjustable on the pin. The operation for replacing said seal is easier and more rapid.

Figure 2:
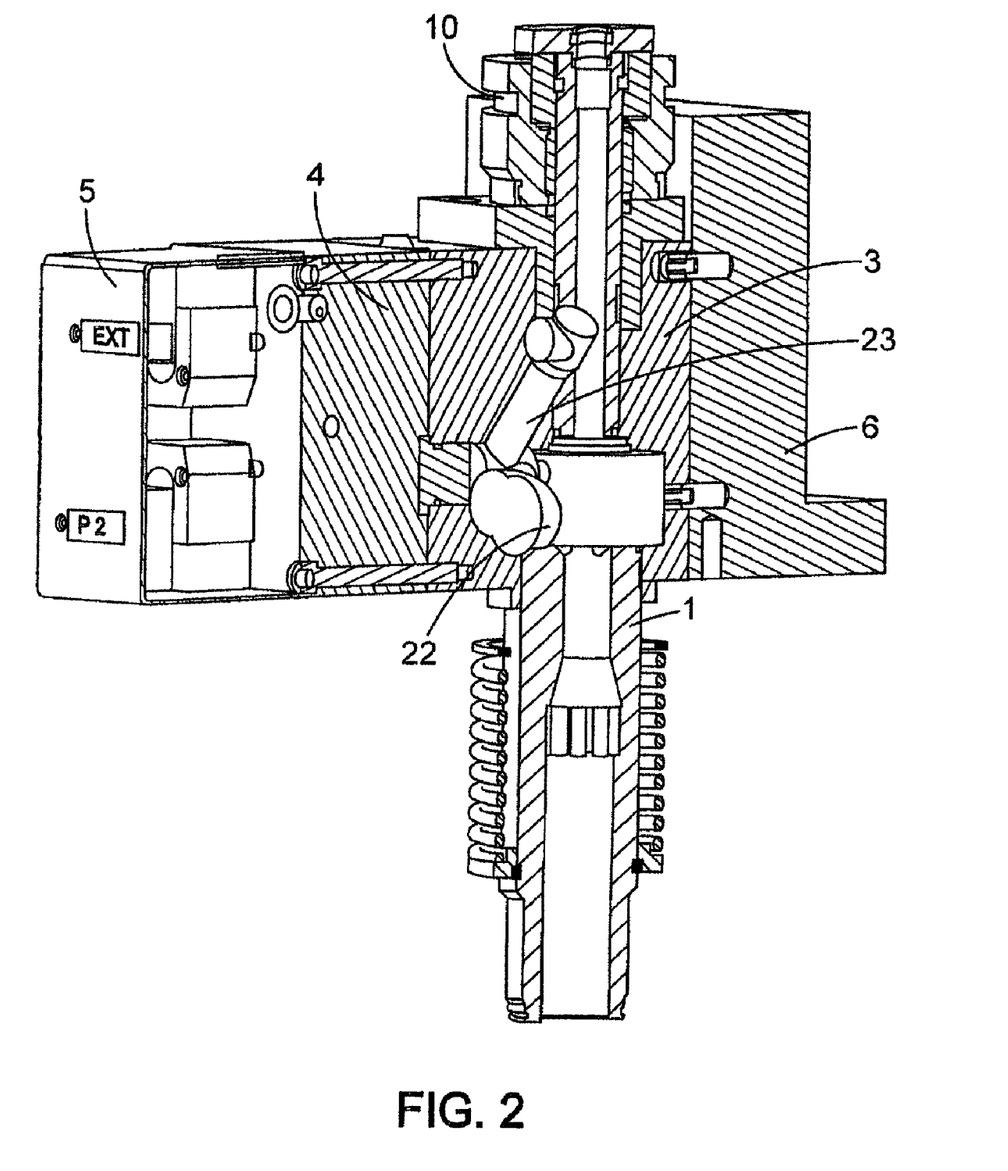
FIG. 2 is a view in longitudinal section of a control assembly of the type shown in FIG. 1.
Figure 3:
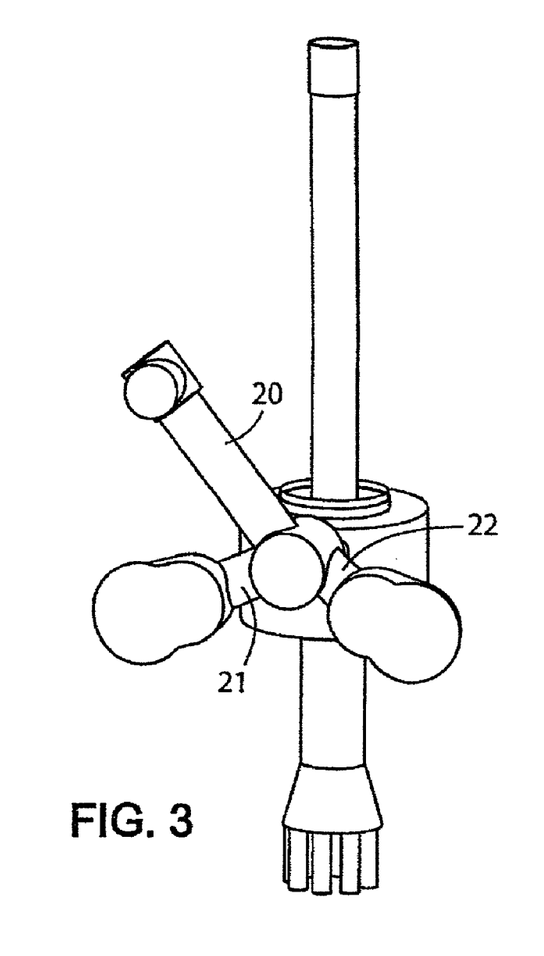
FIGS. 3 and 4 are three-dimensional views of the internal pipes for the passage of blowing fluid for the control assembly shown in FIGS. 1 and 2, according to two variants.
Figure 4:
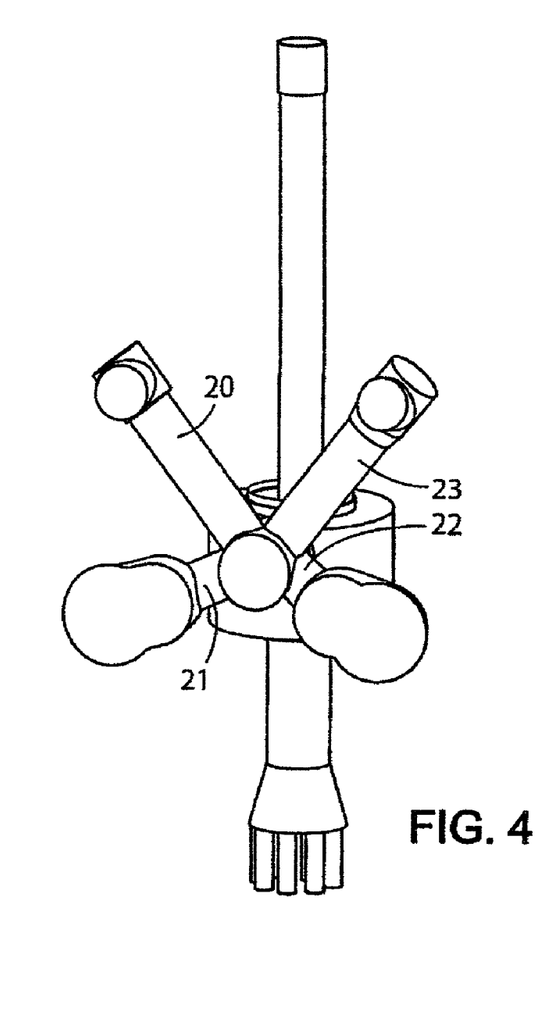

FIGS. 3 and 4 show the dead volumes associated with two embodiments of the assembly of the general type shown in FIGS. 1 and 2. In FIG. 3, the secondary pipes 20, 21, 22 correspond respectively to the channels for the passage of blowing, pre-blowing and discharge air and are respectively connected to the housings for the blowing, pre-blowing and exhaust valves. In FIG. 4, an additional channel 23 is assigned for the recycling and is connected to the housing of a recycling valve.

In the control assembly according to the invention a plurality of pipes are provided comprising pipes 20, 21, 22, 23 inside the body 3 housing the blow pin 1 and connecting the valves to the blow pin 1, in addition to the pipes 25b, 27b, 29b, 31b inside the body 3 housing the blow pin 1 and connecting at least one source of blowing fluid and at least one discharge outlet of blowing fluid (said sources being both connected to the rear flange 6) to the valves.

Figure 5:
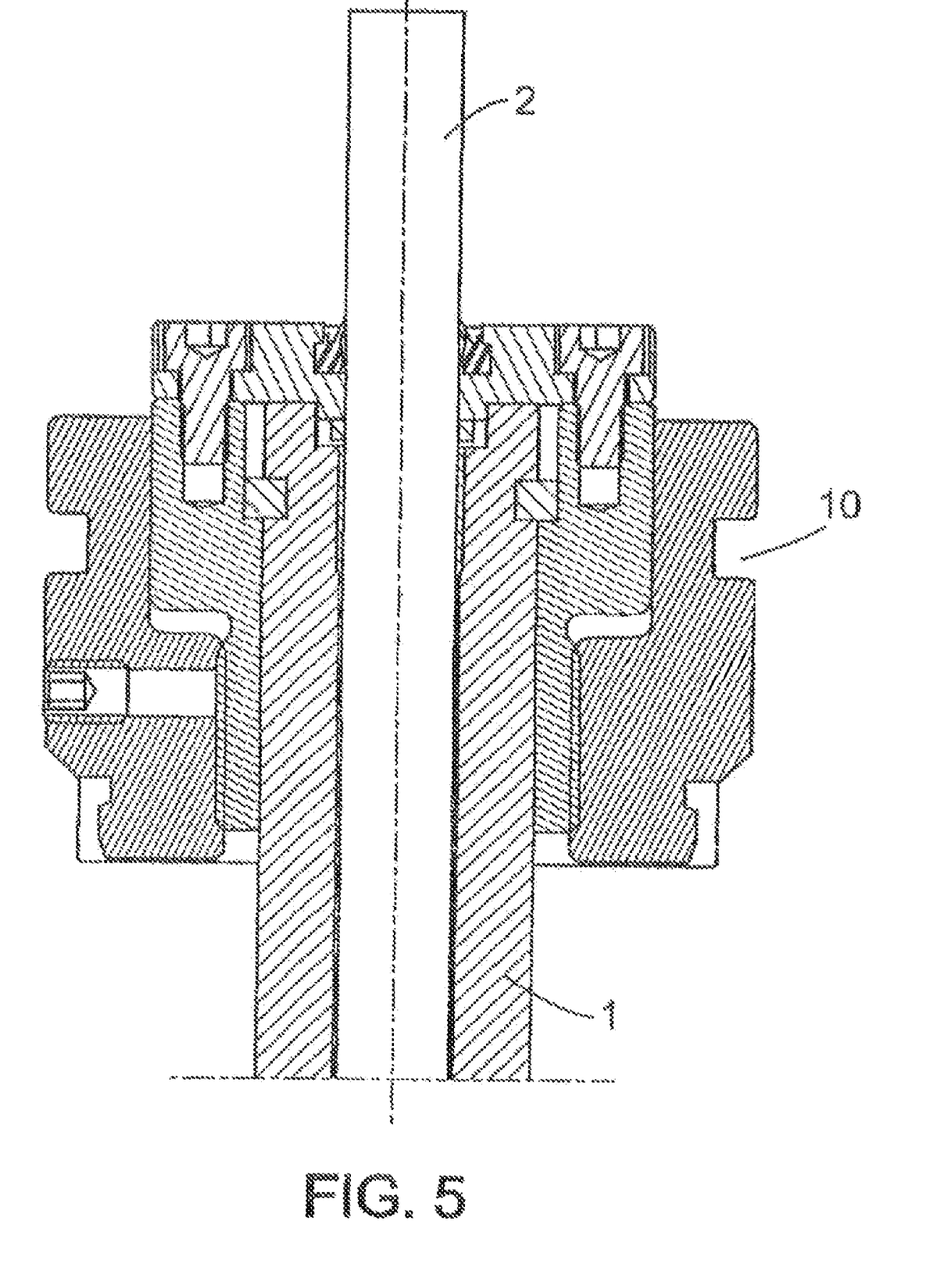
FIG. 5 is a detailed view of part of FIG. 2.
Figure 8:
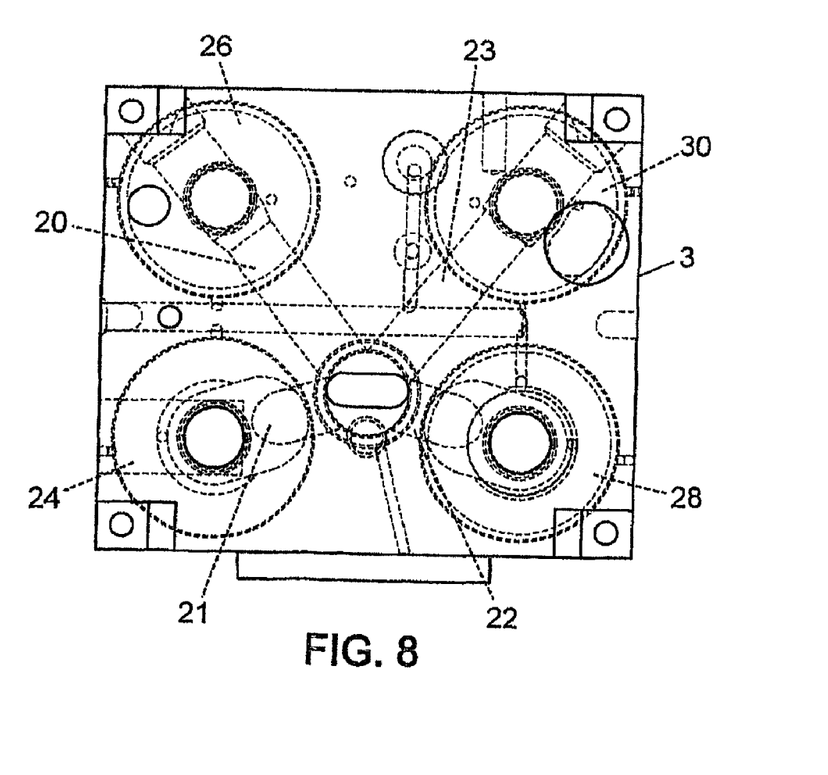
FIG. 8 is an enlarged front view of FIG. 6 showing the different valves and the pipes for the passage of fluid connecting the valves to the blowing nozzle.

FIGS. 5 and 8 show more precisely front views of the control assembly according to the invention with the different housings for valves and the pipes connecting the valves to the blowing nozzle.

Figure 9:
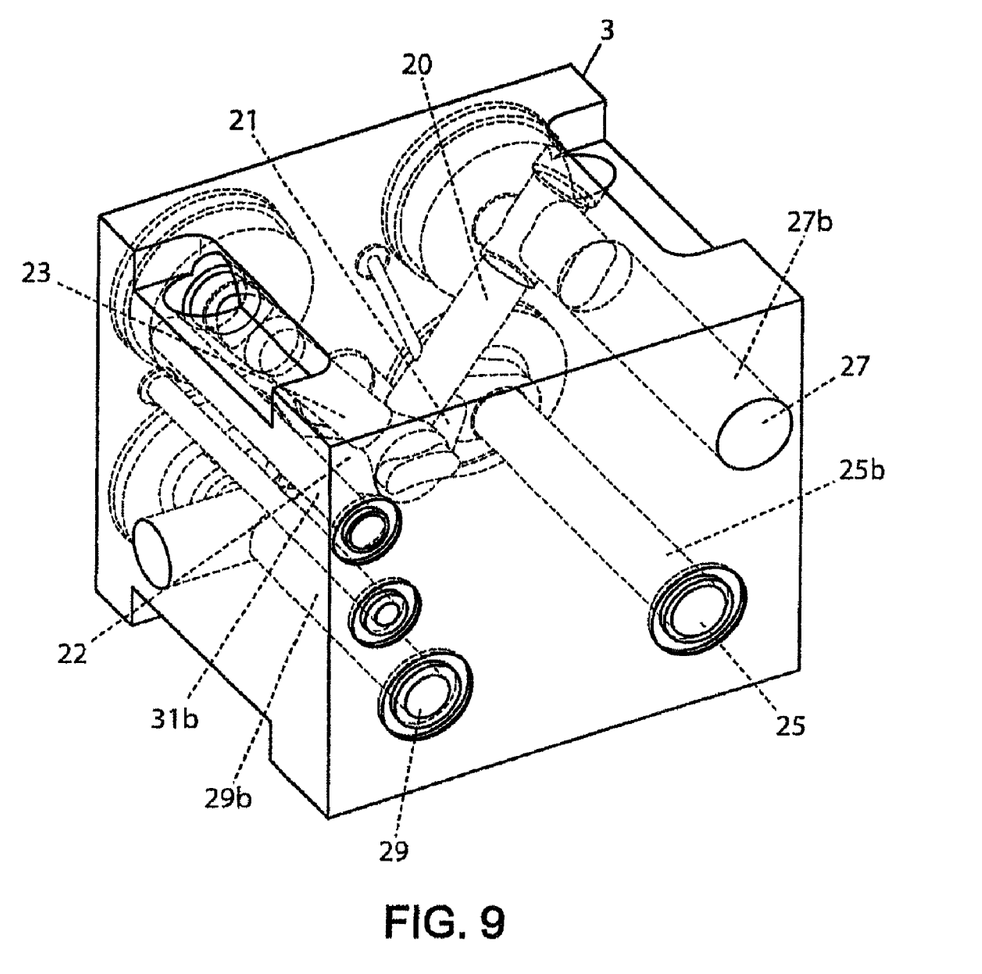
FIG. 9 is a view in rear perspective of the central unit housing the blow pin with the different pipes for the passage of fluid connecting the rear flange to the unit housing the valves, in addition to the different pipes for the passage of fluid connecting the valves to the blowing nozzle.

More specifically, preferably, the unit 4 contains a plurality of housings for valves, namely:

a first housing 24 for a valve, known as the pre-blowing valve or moderate pressure valve, connecting the nozzle to a source of fluid at moderate pressure, i.e. a pressure lower or slightly greater than approximately ten bars, by means of a pre-blowing pipe 25 formed by a first part consisting of the aforementioned pipe 25a in the rear flange 6 and of a second part consisting of the aforementioned pipe 25b, illustrated in FIG. 9, passing through the central body 3 and allowing the pre-blowing of the container, said pre-blowing pipe 25 being supplied by a source of moderate pressure by connecting said source to the rear flange 6, the valve being connected to the blowing nozzle by means of a secondary pre-blowing pipe 21, as illustrated more specifically in FIGS. 3 and 4;

a second housing 26 for a valve, known as the blowing valve or high pressure valve, connecting the nozzle to a source of fluid at high pressure, i.e. a pressure of several tens of bars, advantageously 40 bars ($40 \times 10^5$ Pa) by means of a blowing pipe 27 formed by a first part consisting of the pipe 27a in the rear flange 6 and by a second part consisting of the pipe 27b passing through the central body 3 and allowing the blowing of the preform at high pressure by means of the connection of the high pressure valve to the nozzle by means of a secondary blowing pipe 20;

a third housing 28 for a valve, known as the exhaust valve or expansion valve, connected to the nozzle by a secondary discharge pipe 22 for the discharge of air, which is actuated for the rapid elimination of the residual pre-blowing/blowing fluid in the blank and connected to at least one fluid discharge outlet by an exhaust pipe 29 formed by a first part consisting of the pipe 29a in the rear flange 6 and by a second part consisting of the pipe 29b in the central body 3, and optionally, a fourth housing 30 for a valve, known as the recycling valve which is actuated after the blowing step and is connected to the nozzle by a second recycling pipe 23 and to a source for recycling fluid, for example to the source at moderate pressure or to a source at low pressure, by a recycling pipe 31 formed by a first part consisting of the pipe 31a in the rear flange 6 and by a second part consisting of the pipe 31b in the central body 3. More specifically, after blowing, the fluid which is discharged is still at significant pressure and may be recovered to be directed toward a source of fluid at moderate pressure or low pressure (for example for the pre-blowing). The recycling valve is actuated after the blowing whilst the exhaust valve is actuated last of all for the elimination of the residual blowing fluid in the blown container.

As has been described above, a blowing sequence normally comprises a step of pre-blowing the preform using a fluid (generally air), at moderate pressure (for example $7 \times 10^5$ Pa), then the blowing step itself, at high pressure (for example $40 \times 10^5$ Pa), generally accompanied by mechanical axial stretching by means of the drawing rod 2, possibly a recycling step and finally an exhaust step with the discharge of the pre-blowing/blowing air toward a discharge outlet for blowing fluid, connected to the rear flange 6. For these different steps, the pre-blowing, blowing, possibly recycling, and exhaust valves are sequentially controlled.

To achieve this and to sum up, the control assembly comprises a plurality of valves, including a valve connected to a first source of blowing fluid (for example a source at moderate pressure) and a valve connected to a second source of blowing fluid, at a greater pressure than the blowing fluid from the first source (for example a source at raised pressure). An expansion valve is also provided, connected to the blow pin 1 and capable of discharging the blowing fluid blown into the container toward at least one discharge outlet for blowing fluid, in addition to a recycling valve capable of recycling the blowing fluid blown into the container, for example the blowing fluid blown at high pressure, to convey it back toward the source of fluid at moderate pressure or a further source of blowing fluid.

Advantageously, the different housings 24, 26, 28, 30 of the valves are radially narrowed, i.e. in a direction substantially perpendicular to the blow pin 1, i.e. perpendicular to the axis defined by the pin 1 and the drawing rod 2.

According to a first embodiment of the solenoid valves, each housing 24, 26, 28, 30 of the solenoid valves is machined so as to define, directly in the unit 4 housing the solenoid valves, the chamber of the solenoid valve capable of housing the mobile core of the solenoid valve, said core forming a flap valve for the opening and closing.

According to a second embodiment of the solenoid valves, each housing 24, 26, 28, 30 of the solenoid valves is shaped to receive a solenoid valve cartridge comprising a casing defining a chamber housing a mobile core or piston. The casing of the solenoid valve cartridge defines, in the chamber, a seat capable of receiving in a sealed resting position, the head of the mobile core forming the flap valve. More specifically, a solenoid valve cartridge comprises a casing defining a chamber and provided with a seat. The chamber houses a mobile core (or piston). The seat may receive in a sealed resting position said mobile core of which the head forms a flap valve when it rests sealingly against said seat. The wall of the casing is perforated by at least one aperture in communication with a pipe for supplying fluid. A closure cap of the casing of the solenoid valve is fixed to a wall of the body, a device for piloting the solenoid valve being mounted on said cap. Said piloting device is of the pneumatic type.

Figure 6:
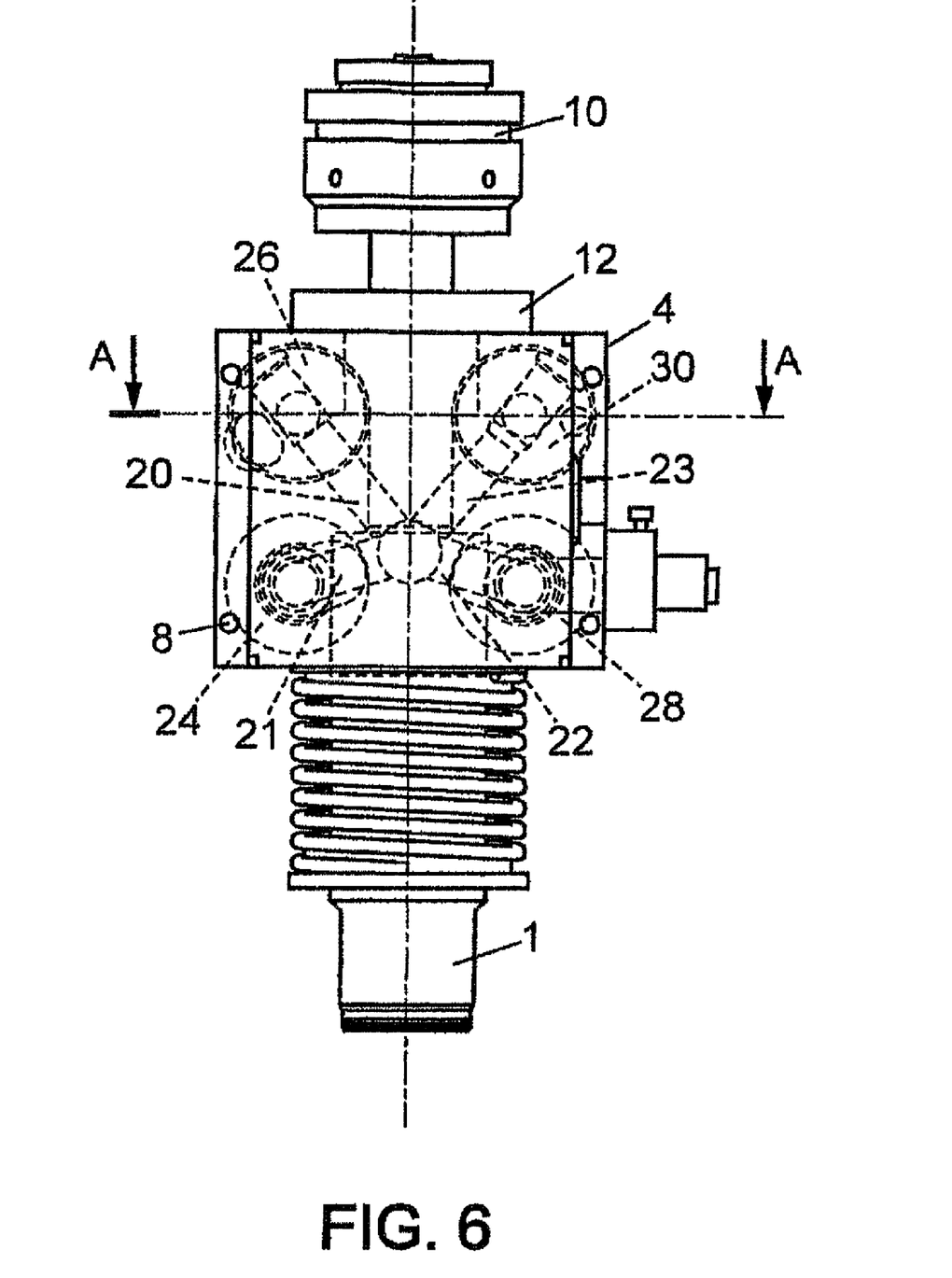
FIG. 6 is a front view of a control assembly according to an embodiment of the invention with, in dotted lines, the housings of the valves and the internal pipes connecting the valves to the blowing nozzle.
Figure 11:
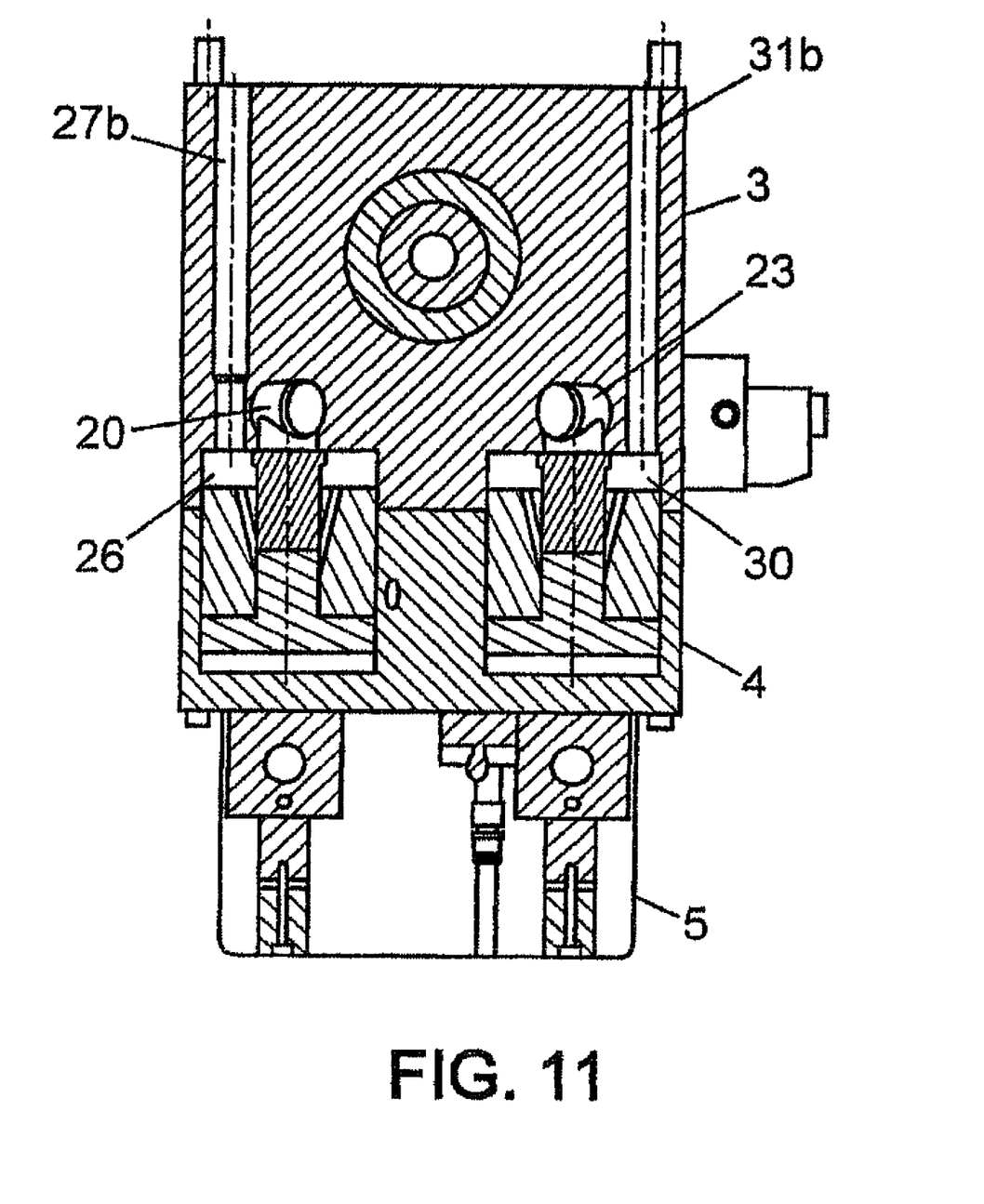
FIG. 11 is a view in planar section of the control assembly taken along the plane A-A of FIG. 6, perpendicular to the longitudinal axis defined by the blow pin.

FIG. 11 shows a view in section according to the plane A-A of FIG. 6 of the control assembly according to the invention. An embodiment of the housings of the valves and more specifically the housings 26, 30 of the blowing and recycling valves may, therefore, be seen in this view in section, it being understood that the housings for the different valves provided in the unit 4 housing the valves are all identical.

It has to be understood that an embodiment has been shown of the position of the different valves in their unit, but that the functioning and the position of each valve may be modified according to the pilot controls and the connections on the rear flange 6.

The present invention also relates to a machine, using a pressurized fluid, for blowing containers from blanks made from thermoplastic material of which the body is enclosed in a blow mold, said machine comprising a nozzle having one end shaped to be functionally and sealingly connected to the interior of a blank and comprising a plurality of solenoid valves for the selective connection of said nozzle to one respective source of moderately pressurized fluid for the pre-blowing, a source of highly pressurized fluid for the blowing and a discharge outlet for discharging the pre-blowing/blowing fluid, the blowing machine comprising at least one control assembly as described above.

The invention claimed is:

1. A blowing fluid flow control assembly for a container blowing machine, said assembly comprising:
  a blow pin;
  a plurality of pipes for the circulation of a blowing fluid allowing the circulation of the blowing fluid between at least one source of blowing fluid, at least one discharge outlet for fluid and said blow pin;
  valves capable of controlling the circulation of the blowing fluid in said plurality of pipes for the circulation of fluid;
  wherein the valves are all placed on a front of a body housing the blow pin, and said plurality of pipes comprises pipes inside the body housing the blow pin.

2. The blowing fluid flow control assembly as claimed in claim 1, wherein said pipes inside the body housing the blow pin connect the valves to the blow pin.

3. The blowing fluid flow control assembly as claimed in claim 1, wherein said pipes inside the body housing the blow pin connect said at least one source of blowing fluid and said at least one discharge outlet for fluid to the valves.

4. The blowing fluid flow control assembly as claimed in claim 1, wherein the valves are housed in a unit removably mounted on the front of the body housing the blow pin.

5. The blowing fluid flow control assembly as claimed in claim 1, wherein further comprising a bored flange which is removably mounted on a rear of the body housing the blow pin and to which said at least one source of blowing fluid and said at least one discharge outlet for blowing fluid are connected.

6. The blowing fluid flow control assembly as claimed in claim 5, wherein the bored flange comprises internal pipes connecting said at least one source of fluid and said at least one discharge outlet for blowing fluid to internal pipes of the body housing the blow pin.

7. The blowing fluid flow control assembly as claimed in claim 5, wherein at least one of the bored flange and a unit housing the valves is mounted by screwing, using screws, onto the body housing the blow pin and heads of the screws are oriented toward a front of the blowing fluid flow control assembly.

8. The blowing fluid flow control assembly as claimed in claim 1, further comprising a drawing rod which is axially mobile in the blow pin, said drawing rod passing through the body housing the blow pin.

9. The blowing fluid flow control assembly as claimed in claim 1, wherein the valves comprise a valve connected to a first source of blowing fluid and a valve connected to a second source of blowing fluid at a higher pressure than the blowing fluid of the first source.

10. The blowing fluid flow control assembly as claimed in claim 1, further comprising an expansion valve connected to the blow pin and capable of discharging the blowing fluid blown into the container toward said at least one discharge outlet.

11. The blowing fluid flow control assembly as claimed in claim 1, further comprising a recycling valve capable of recycling the blowing fluid blown into the container by conveying the blowing fluid to a source of blowing fluid.

12. The blowing fluid flow control assembly as claimed in claim 1, wherein the valves are positioned in the housings which are narrowed in a direction substantially perpendicular to the blow pin.

13. The blowing fluid flow control assembly as claimed in claim 4, further comprising a casing housing pilot controls for the valves, said casing being removably mounted on a front of the unit housing the valves.

14. The blowing fluid flow control assembly as claimed in claim 13, wherein the casing is mounted by screwing, using screws, onto the unit housing the valves, and heads of said screws are oriented toward a front of the blowing fluid flow control assembly.

15. The blowing fluid flow control assembly as claimed in claim 1, wherein the valves are solenoid valves.

16. The blowing fluid flow control assembly as claimed in claim 15, wherein pilot controls for the solenoid valves are electromechanical or electropneumatic.

17. The blowing fluid flow control assembly as claimed in claim 16, wherein the solenoid valves are positioned in housings, each housing of the solenoid valves is provided in a unit housing the solenoid valves and is machined to define, directly in the unit housing the solenoid valves, a chamber of the solenoid valve capable of housing a mobile core of the solenoid valve.

18. The blowing fluid flow control assembly as claimed in claim 15, wherein the solenoid valves are positioned in housings, each housing is provided in a unit housing the solenoid valves, and is shaped to receive one respective solenoid valve cartridge.

19. A machine, using pressurized fluid, for blowing containers from blanks made from thermoplastic material of which the body is enclosed in a blow mold, said machine comprising a nozzle having one end shaped to be functionally and sealingly connected to the inside of a blank and comprising a plurality of valves for selectively connecting said nozzle to one respective source of moderately pressurized fluid for the pre-blowing, a source of highly pressurized fluid for the blowing and an exhaust for discharging the pre-blowing/blowing fluid, the machine further comprising at least one blowing fluid flow control assembly as claimed in claim 1.

20. The machine as claimed in claim 19, wherein the control of the movement of the blow pin is ensured by means of equipment guided and fixed to the blowing fluid flow control assembly, and actuated by a cam on a roller.

21. The machine as claimed in claim 20, wherein the blow pin is provided with a groove, a fork guided in the groove ensuring the conversion of the movement of the roller on the cam into a sliding movement of the equipment and the blow pin.

22. The machine as claimed in claim 20, wherein the counterforce exerted to maintain the drive roller on the cam is produced by a mechanical spring or by a pneumatic spring incorporated in the form of a piston fixed to and concentric to the blow pin, said pneumatic spring traveling in a chamber of which the upper part is pressurized.

23. The machine as claimed in claim 19, wherein the control of the movement of the blow pin is ensured pneumatically, the blow pin being fixed to a concentric piston, traveling in a chamber of which the upper and lower parts are connected to a pneumatic distributor.

24. The machine as claimed in claim 19, wherein the lower position of the blow pin is implemented by a stop which may be adjusted on said blow pin, said stop being arrested by damping contact on the upper part of the body housing the blow pin.

25. The blowing fluid flow control assembly as claimed in claim 4, wherein the front of the body is a single face of the body housing the blow pin.

26. A blowing fluid flow control assembly for a container blowing machine, said assembly comprising:
  a blow pin;
  a plurality of pipes for the circulation of a blowing fluid allowing the circulation of the blowing fluid between at least one source of blowing fluid, at least one discharge outlet for fluid, and said blow pin; and
  valves capable of controlling the circulation of the blowing fluid in said plurality of pipes for the circulation of fluid;
  wherein the valves are all placed on a front of a body housing the blow pin, and the valves are housed in a unit removably mounted on the front of the body housing the blow pin.

27. The blowing fluid flow control assembly as claimed in claim 26, further comprising a casing housing pilot controls for the valves, said casing being removably mounted on the front of the unit housing the valves.

28. The blowing fluid flow control assembly as claimed in claim 26, wherein the front of the body is a single face of the body housing the blow pin.

29. A blowing fluid flow control assembly for a container blowing machine, said assembly comprising:
  a blow pin;
  a plurality of pipes for the circulation of a blowing fluid allowing the circulation of the blowing fluid between at least one source of blowing fluid, at least one discharge outlet for fluid, and said blow pin;
  valves capable of controlling the circulation of the blowing fluid in said plurality of pipes for the circulation of fluid; and
  a bored flange which is removably mounted on a rear of a body housing the blow pin and to which said at least one source of blowing fluid and said at least one discharge outlet for blowing fluid are connected,
  wherein the valves are all placed on a front of the body housing the blow pin.

* * * * *